United States Patent [19]

Wilkins

[11] Patent Number: 5,464,307
[45] Date of Patent: Nov. 7, 1995

[54] APPARATUS FOR NEAR VERTICAL LAYING OF PIPELINE

[75] Inventor: Jesse R. Wilkins, Picayune, Miss.

[73] Assignee: McDermott International, Inc., New Orleans, La.

[21] Appl. No.: 174,971

[22] Filed: Dec. 29, 1993

[51] Int. Cl.[6] .................................................. F18L 1/00
[52] U.S. Cl. ........................ 405/166; 405/158; 405/170
[58] Field of Search ................................... 405/158, 166, 405/169, 170

[56] References Cited

U.S. PATENT DOCUMENTS

| 1,220,189 | 3/1917 | Chapman | 405/167 |
|---|---|---|---|
| 3,581,506 | 6/1971 | Howard | 405/166 |
| 3,585,806 | 6/1971 | Lawrence | 405/166 |
| 3,680,322 | 8/1972 | Nolan et al. | 405/166 |
| 3,860,122 | 1/1975 | Cernosek | 414/732 |
| 4,068,490 | 1/1978 | Jegousse | 405/166 |
| 4,486,123 | 12/1984 | Koch et al. | 405/169 |

FOREIGN PATENT DOCUMENTS 1532570  7/1968  France .
2204106  11/1988  United Kingdom .

Primary Examiner—John A. Ricci
Attorney, Agent, or Firm—Robert J. Edwards; D. Neil LaHaye

[57] ABSTRACT

An apparatus for near vertical laying of pipeline offshore. A support base and framework on a lay vessel support an alignment tower that extends upwardly from the base and is designed to support the pipe joint to be added to the pipeline. A support tower that supports the weight of the pipeline is attached to the support base such that the support tower extends downwardly therefrom into the water. A travel block is adapted for movement along the length of the tower for raising or lowering the pipe and pipeline. A pedestal that is movable between open and closed positions for receiving a pipe section from the travel block and supporting the weight of the pipeline is positioned near the bottom of the tower. A strongback or boom may be used to grasp a pipe joint from a ready rack and transfer the pipe joint into the alignment tower for addition of the pipe joint to the pipeline. The extension of the support tower into the water eliminates the need for a stinger. The attachment position and extension of the support tower into the water also lowers the center of gravity of the apparatus.

4 Claims, 4 Drawing Sheets

APPARATUS FOR NEAR VERTICAL LAYING OF PIPELINE

BACKGROUND OF THE INVENTION

1. Field of the Invention

The invention is generally related to the laying of pipeline offshore and particularly to the near vertical laying of pipeline offshore in deep water.

2. General Background

The laying of offshore pipelines has been done for many years utilizing the technique referred to as S-lay. In the S-lay technique, joints of pipe are added to the pipeline in a horizontal position on the deck of a lay barge. The pipeline then curves over the stern of the barge, angles down toward the seabed, curves back to horizontal and lays on the seabed. The profile of the pipeline from the lay barge to the seabed is in the form of a long "S" which leads to the name of S-lay Although S-lay has been the method of choice for virtually all pipeline installed to date, there are physical limitations on the use of this technique. Chief among these is water depth. As the water depth increases, the ability to move the vessel on anchors becomes more and more difficult and the horizontal component of the pipe tension becomes greater and greater. The offshore pipeline industry has been aware of this problem for years and has as a solution, accepted the concept of near vertical lay, called J-lay, as the system of choice for deep water pipe laying. It should be understood that the definition of deep water, when referring to the use of J-lay, is a direct function of pipe diameter. This relationship is a result of the minimum water depth required for pipe of a certain diameter to achieve the proper flex during the vertical laying operation. There is also a maximum practical depth for specific pipe diameters. As an example, pipe having a diameter of 6.625 inches requires a minimum water depth, with no water in the pipe, of 124 feet. At the opposite end of the scale, pipe having a diameter of 42 inches requires a minimum water depth, with no water in the pipe, of 1,337 feet.

Considerable work has been done over the years on the theoretical aspects of the J-lay concept, but very little work has been done on the actual hardware and equipment needed for this type of system. Most of the systems proposed have utilized existing semi-submersible drilling units. These units, which are capable of being modified for this service, were not built to be used as pipe layers and can not be made to be very efficient during pipe laying operations.

Another problem area in laying pipeline offshore is the storage, transportation, and transfer of pipe to the lay vessel. In normal operations, the line pipe for the pipeline is transported to the field in forty foot long joints. The transport vessel, which is usually a small material barge or a special purpose pipe haul boat, is tied to the side of the lay vessel as the pipe is transferred to the lay vessel. Transfer of the pipe one joint at a time may take several days. The transfer of pipe from between vessels subject to sea induced motion is hazardous to personnel and equipment under good sea conditions and becomes impossible to do safely under bad conditions.

Applicants are aware of a system that utilizes a ramp that can be adjusted from horizontal to vertical. It uses large tensioners to grip the pipe and apply the necessary amount of tension to the system. This system has never been used for deep water pipeline construction.

Offshore pipe laying systems, those in use(S-lay) and theoretical proposals(J-lay), have certain things in common. The systems may or may not use pipe add ons that have been multi-jointed outside the system to provide pipe joint lengths greater than the normal forty foot pipe length. Theoretical J-lay systems have proposed joint lengths of eighty feet or more. A single station is used to accomplish the welding, NDT(non-destructive testing), and pipe coating of joints. In J-lay, it is necessary to have a means to transfer the pipe from the horizontal position on the lay vessel to a near vertical position on the lay line. It is also necessary to have some means of lowering the pipe as the lay vessel moves forward. A particular problem in this area has been the issue of devising an efficient manner of transferring the load of the pipeline to a holding mechanism so that the lowering mechanism can then be raised in preparation for receiving the weight of the pipeline after addition of the next pipe joint. Copending application Ser. No. 08/154,320 filed Nov. 18, 1993 discloses an apparatus for near vertical laying of pipeline that includes a tower on the lay barge that supports the weight of the flooded pipeline and uses a travel block and pedestal arrangement that allows for a ready weight transfer of the pipeline from the travel block to the pedestal during lowering of the pipeline after a new pipe joint has been added. A problem with the system is that the major loads of the pipeline are carried through compression in the tower during lowering. This puts large loads above the vessel deck on a continuous basis and raises the center of gravity of the system above the normal center of gravity of the vessel.

SUMMARY OF THE INVENTION

The present invention addresses the above problems in a straightforward manner. What is provided is an apparatus for near vertical laying of a pipeline offshore that lowers the center of gravity of the system below the vessel. An alignment tower that extends above the deck of the vessel supports the weight of only one multijoint of pipe and the internal lineup clamp and storage and transfer system. The tower that supports the weight of the flooded pipeline extends below the vessel into the water and replaces the stinger. The travel block and pedestal used to support and lower the pipeline in the tower are positioned in the tower. The travel block is moved in and out of the water along the length of the tower during operations.

BRIEF DESCRIPTION OF THE DRAWINGS

For a further understanding of the nature and objects of the present invention reference should be had to the following description, taken in conjunction with the accompanying drawings in which like parts are given like reference numerals and, wherein.

DETAILED DESCRIPTION OF THE PREFERRED EMBODIMENT

Figure 1:
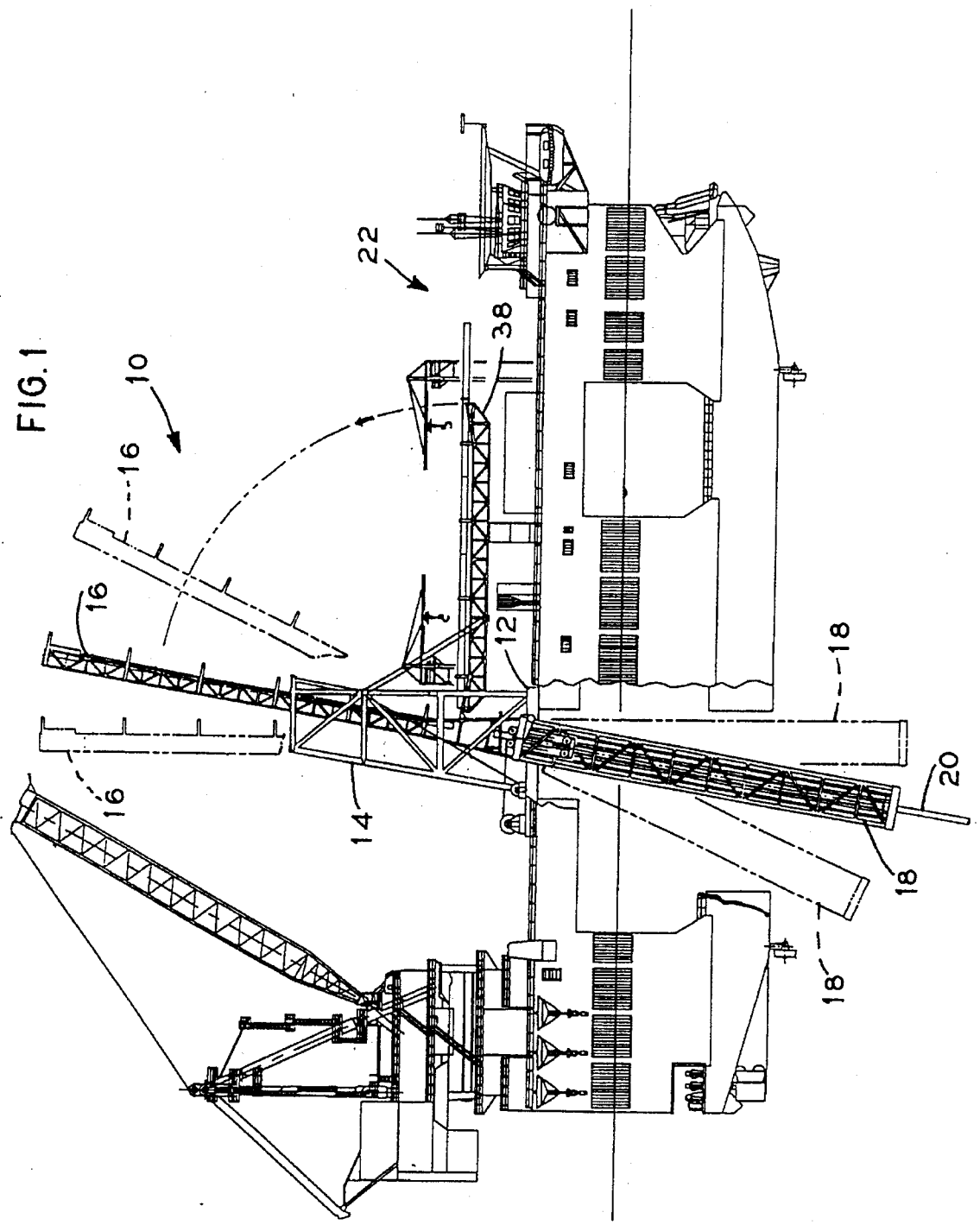
FIG. 1 is an elevation view of the invention.

Referring to FIG. 1, it is seen that the invention is generally indicated by the numeral 10. Apparatus 10 for near vertical laying of pipeline is generally comprised of support base 12, framework 14, pipe joint alignment tower 16, support tower 18, and means in said support tower for receiving and supporting the weight of the pipeline 20.

Figure 2:
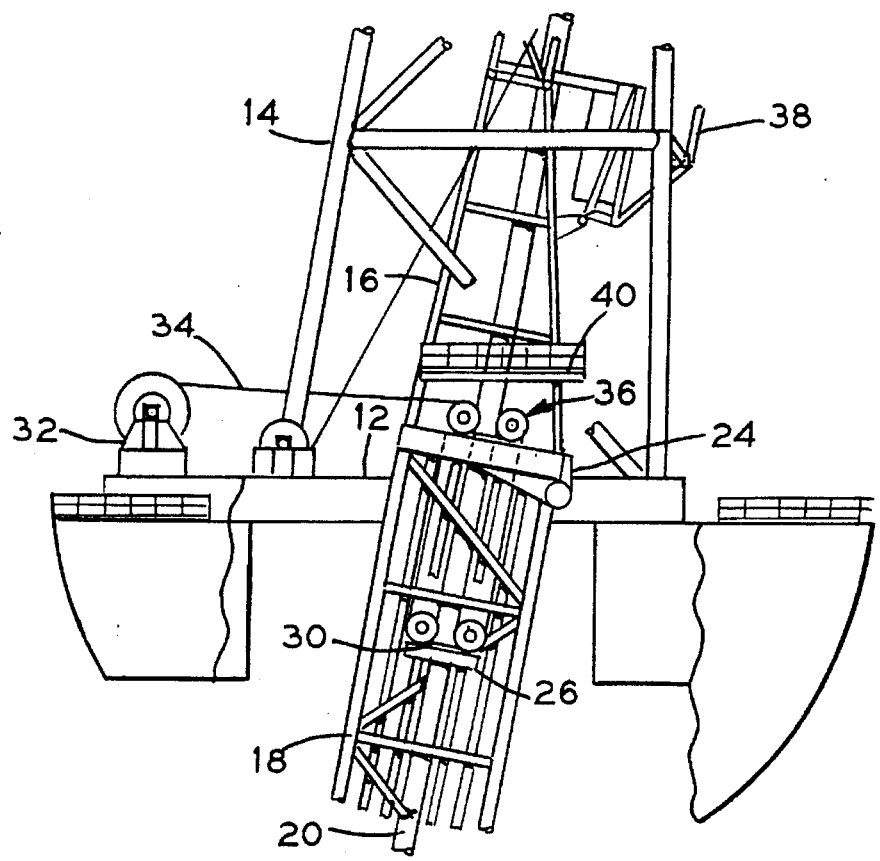
FIG. 2 is a detail view that illustrates the junctures of the support base, alignment tower, and support tower.

Support base 12 is rigidly attached to the lay vessel 22. In the preferred embodiment, support base 12 is adapted to pivotally receive both alignment tower 16 and support tower 18. Support base 12 and apparatus 10 are illustrated in FIG. 1 and 2 as being positioned amid ship on lay vessel 22 at what is commonly referred to as a moon pool. However, it should be understood that apparatus 10 may also be positioned at a side or the stern of lay vessel 22 to accommodate the specific needs of the pipe laying operation.

Framework 14 is rigidly attached to support base 12 and extends upwardly therefrom. Framework 14 provides support to pipe joint alignment tower 16.

Pipe joint alignment tower 16 is lightly framed as it only has to support the weight of one joint or multijoint of pipe and the internal lineup clamp and transfer system. Pipe joint alignment tower 16 is a U-shaped frame open on one side along its length and is designed to support the weight of the pipe joint during welding to the pipeline. As seen in the phantom views in FIG. 1, pipe joint alignment tower 16 is attached to support base 12 and framework 14 so that it may be selectively positioned at several different angles according to that required during pipe laying operations. Pipe joint alignment tower 16 is in alignment with support tower 18.

Support tower 18 is pivotally supported at its upper end in support base 12 by support framing 24, best seen in FIG. 2. As indicated by the phantom views in FIG. 1, support framing 24 provides for selective pivoting of support tower 18 according to needs of the pipe laying operations as mentioned above for pipe joint alignment tower 16. Support tower 18 is designed to be able to support the weight of the flooded pipeline during pipe laying operations. Means for receiving the weight of the pipeline is provided in the form of travel block 26 and pedestal 28, seen in FIG. 2–4. Travel block 26 and pedestal 28 are used in cooperation to support and lower the pipeline after a pipe joint has been added. Pedestal 28 supports the weight of the pipeline at a buckle arrestor 30 while a pipe joint is being added to the pipeline. After addition of the new joint, the travel block is raised to pick up the pipeline load, the pedestal is opened, and then the travel block 26 is lowered in support tower 18 via winch 32, cable 34, and crown block 36 and the weight of the pipeline is transferred to pedestal 28. Travel block 26 is then raised back to the upper end of support tower 18 in preparation for addition of another pipe joint to the pipeline while the pedestal supports the pipeline. Although any suitable equipment may be used to achieve the operations required of the travel block and pedestal, the travel block and pedestal configuration described in copending application Ser. No. 08/154,320 filed Nov. 18, 1993 is preferred for the most efficient and time saving weight transfer.

The transfer of pipe joints from horizontal on a pipe ready rack into pipe joint alignment tower 16 is illustrated as being accomplished by the use of an alignment boom 38 that is pivotally attached to pipe joint alignment tower 16. However, it should be understood that any suitable transfer means such as a strongback may also be used.

Figure 3:
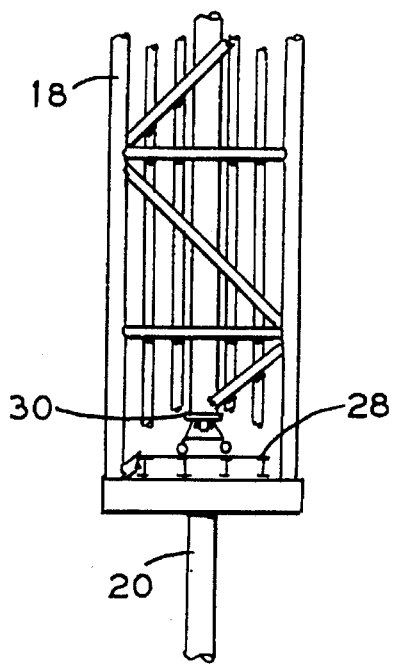
FIG. 3 is a detail view that illustrates the lower end of the support tower.
Figure 4:
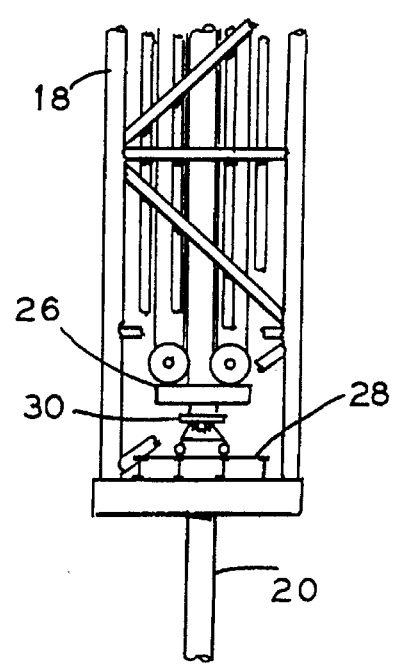
FIG. 4 is a detail view that illustrates the lower end of the support tower with the travel block near the pedestal.

In operation, pipe joint alignment tower 16 and support tower 18 are aligned with each other and set at the angle required for the pipe laying operations according to pipe size and water depth. A single pipe joint has the ends prepared for welding to the pipeline and is transferred to a pipe ready rack. Alignment boom 38, or any suitable equipment, receives the pipe joint from cranes and is then pivoted upwardly as indicated by the arrow and line in FIG. 1 to transfer the pipe joint to pipe joint alignment tower 16. Clamps provided in pipe joint alignment tower 16 receive the pipe joint and hold it in place while it is welded to pipeline 20. The clamps provided in pipe joint alignment tower 16 are preferably adjustable to allow for precise alignment of the pipe joint and pipeline. Work deck 40 is provided for personnel and the necessary equipment to carry out the welding and testing operations. During the addition of the pipe joint, pedestal 28 supports the pipeline at a buckle arrestor 30 on the pipeline. An internal line up clamp will typically be provided at the upper end of pipe joint alignment tower 16 for lowering into the pipe joint to the abutting surfaces of the pipe joint and pipeline. Buckle arrestors are provided at selected intervals along the pipeline to prevent buckling of the pipe during laying operations. After the welding, testing, and coating operations are complete, travel block 26 takes the load from pedestal 28 and is lowered in support tower 18 as the lay vessel moves forward. FIG. 3 illustrates a buckle arrestor 30 at pedestal 28 as it supports the pipeline 20 during welding of the next joint and the raising of travel block 28 while FIG. 4 illustrates a just completed transfer between the travel block 26 and pedestal 28 as travel block 26 is beginning to be moved back to the upper end of support tower 18 in preparation for attachment of another pipe joint. Travel block 26 is moved to the upper end of support tower 18 and used to support the pipeline at a buckle arrestor after completion of welding. A pipe joint already positioned in pipe joint alignment tower 16 is then welded to pipeline 20 and the process is repeated. Besides providing for a lower center of gravity, the location of the travel block below the work area eliminates the need to wait for the travel block to clear the work area before proceeding with work on attaching the next pipe joint to the pipeline.

Figure 5:
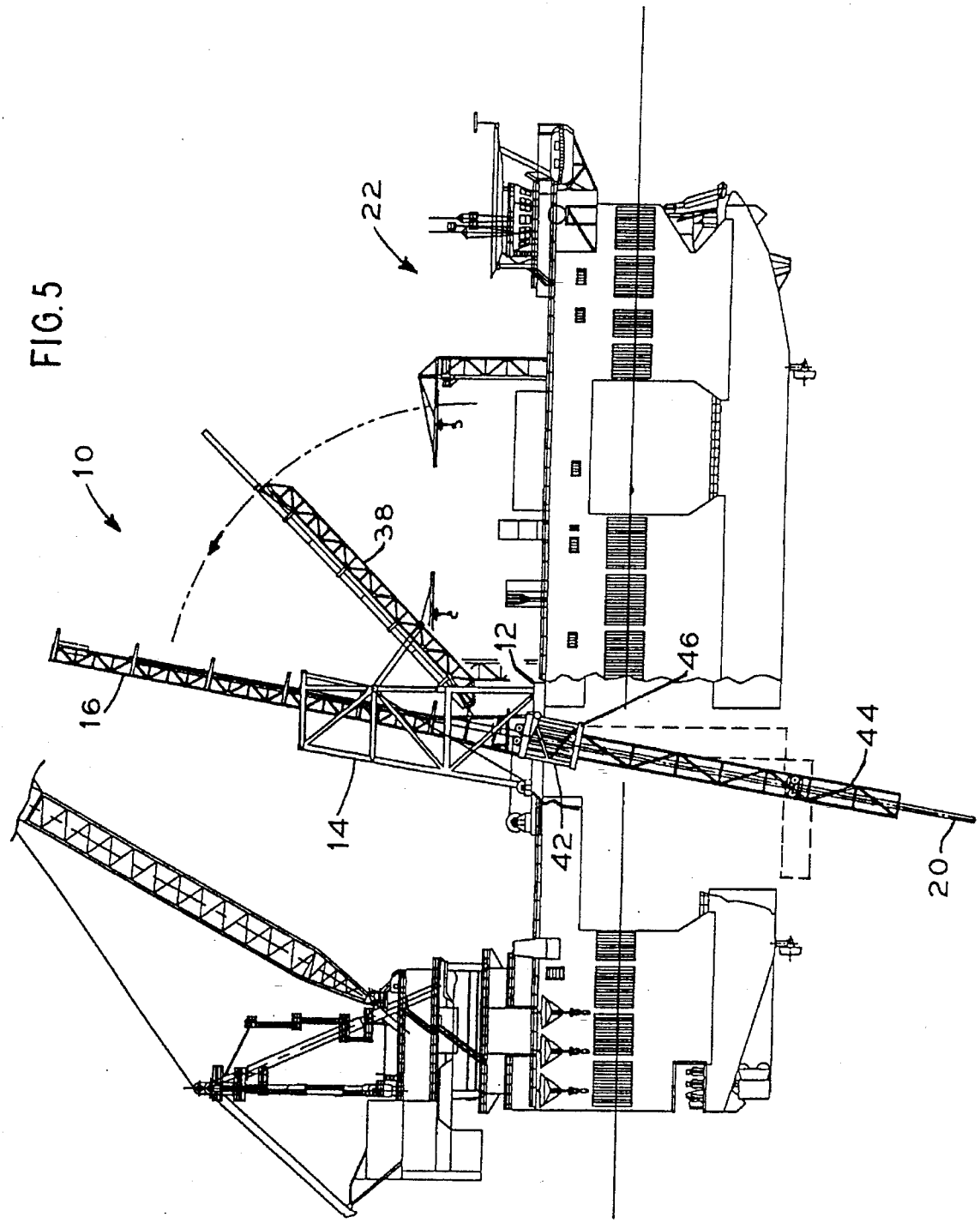
FIG. 5 illustrates an alternate embodiment of the invention.
Figure 6:
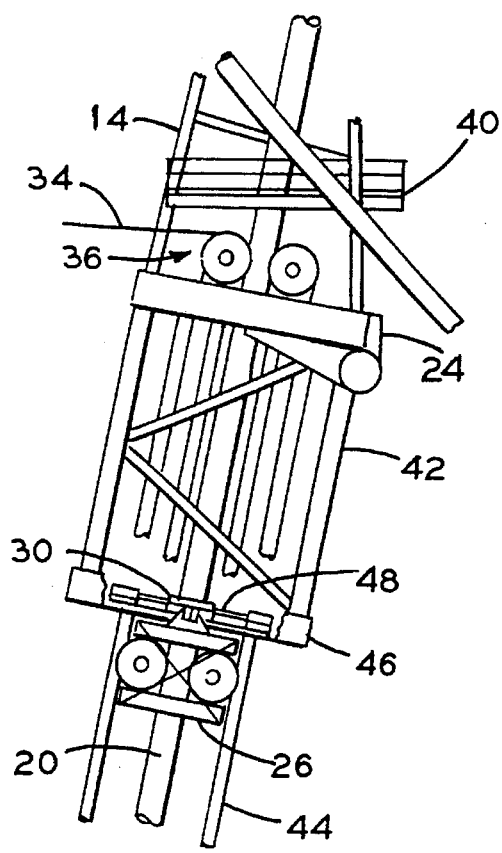
FIG. 6 illustrates a detail view of the stinger support framing and upper end of the stinger of the alternate embodiment.
Figure 7:
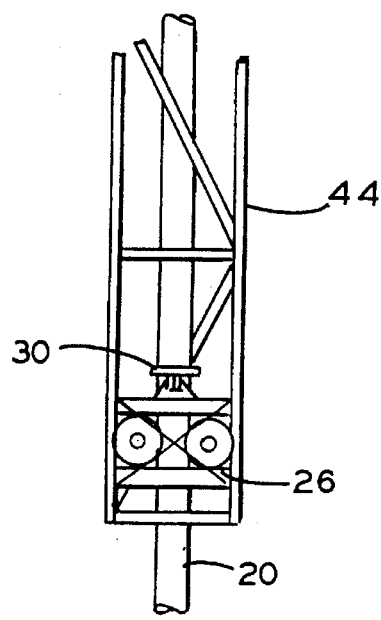
FIG. 7 illustrates a detail view of the lower end of the stinger of the alternate embodiment with the travel block at the lower end of the stinger.

FIG. 5–7 illustrate an alternate embodiment of the invention. The main difference in the alternate embodiment is that the large support tower is replaced by a stinger, the pedestal is moved above the water line, and the travel block moves along the length of the stinger in and out of the water. As seen in FIG. 5, the support tower shown in FIG. 1 is replaced by stinger support frame 42 and stinger 44. As best seen in FIG. 6, stinger support frame 42 is also pivotally supported in support base 12 by support framing 24. Pedestal 46 operates in a similar fashion as above so as to cooperate with travel block 26 for receiving and transferring the weight of the pipeline between the pedestal and travel block. Pedestal 46 is provided with clamp 48 that moves between an open position where it does not support the weight of the pipeline and a closed position where it does support the weight of the pipeline. FIG. 6 illustrates the pedestal clamp and travel block in position for transferring the weight of the pipeline to the travel block. As described above, travel block 26 is supported and moved by cable 34 across crown block 36. Travel block 26 receives the weight of the pipeline from clamp 48 by contact of the upper end of travel block 26 with buckle arrestor 30 on the pipeline. Travel block 26 is then lowered in stinger 44 as lay vessel 22 moves forward to lower and lay pipeline equal to the length of the pipe joint that has been added. Clamp 48 is then closed to receive a buckle arrestor on the pipeline and support the weight of the pipeline while another joint is added and travel block 26 is opened to release the pipeline and raised back up to the pedestal. As illustrated by the dotted lines indicating a phantom view of stinger 44, the lower portion of stinger 44 is hinged such that it may be pivoted upward and locked in an inoperative stowed position to reduce its water depth and resistance to movement of lay vessel 22 when pipe laying operations are not being conducted. As described above, the alternate embodiment is movable within a selected range of angles to provide the most desirable angle for pipe size and water depth. The alternate embodiment provides the additional advantages of the stinger being lighter weight than the support tower and the travel block being the only moving part that is submerged in water below the vessel. The location of the pedestal also keeps it out of the water and provides for easier maintenance.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An apparatus on a vessel for near vertical laying of a pipeline offshore, comprising:
  a. a support base mounted on the vessel;
  b. a framework mounted on said support base and extending upwardly therefrom;
  c. a pipe joint alignment tower pivotally attached to and supported by said support base and framework;
  d. a support tower pivotally attached to said support base and extending downward from said support base; and
  e. means received in said support tower for receiving and supporting the weight of the pipeline, comprising:
    i. a travel block adapted to be movable along the length of said support tower; and
    ii. a pedestal at the lower end of said support tower adapted to receive and support the weight of the pipeline from said travel block.

2. The apparatus of claim 1, further comprising means for transferring a pipe joint from the vessel into said alignment tower.

3. An apparatus on a vessel for near vertical laying of a pipeline offshore, comprising:
  a. a support base mounted on the vessel;
  b. a framework mounted on said support base and extending upwardly therefrom;
  c. a pipe joint alignment tower pivotally attached to and supported by said support base and framework;
  d. a stinger support frame pivotally attached to said support base;
  e. a pedestal attached to said support frame, said pedestal adapted to releasably receive and support the weight of the pipeline;
  f. a stinger attached to the lower end of said stinger support frame and extending downwardly therefrom; and
  g. a travel block received in said stinger so as to be movable along the length of said stinger, said travel block adapted to releasably receive and support the weight of the pipeline in cooperation with said pedestal.

4. The apparatus of claim 3, wherein said stinger is hinged at its lower section to allow pivoting of the lower section upward into a stowed inoperative position.

* * * * *